United States Patent
Hara

(10) Patent No.: US 6,965,418 B2
(45) Date of Patent: Nov. 15, 2005

(54) SEMI-TRANSMITTING REFLECTIVE PLATE, REFLECTIVE PLATE, SEMI-TRANSMITTING POLARIZER, REFLECTIVE POLARIZER AND LIQUID CRYSTAL DISPLAY USING SAME

(75) Inventor: Kazutaka Hara, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 10/253,436

(22) Filed: Sep. 25, 2002

(65) Prior Publication Data

US 2003/0058391 A1 Mar. 27, 2003

(30) Foreign Application Priority Data

Sep. 26, 2001 (JP) ............................ P2001-294930
May 7, 2002 (JP) ............................ P2002-131517

(51) Int. Cl.[7] ..................... G02F 1/1333; G02F 1/1335
(52) U.S. Cl. ......................................... 349/40; 349/114
(58) Field of Search ..................... 349/113–114, 96, 349/40

(56) References Cited

U.S. PATENT DOCUMENTS

| | | | |
|---|---|---|---|
| 5,824,174 A | * 10/1998 | Mitani et al. ................. | 156/99 |
| 6,068,794 A | 5/2000 | Kobayashi et al. | |
| 6,147,738 A | 11/2000 | Okamoto | |
| 6,372,354 B1 | * 4/2002 | Park et al. ................... | 428/447 |
| 6,649,271 B2 | * 11/2003 | Taruishi ...................... | 428/447 |
| 2002/0018163 A1 | * 2/2002 | Yamamoto et al. ........ | 349/122 |

FOREIGN PATENT DOCUMENTS

JP 11-305040 11/1999

* cited by examiner

*Primary Examiner*—Dung T. Nguyen
(74) *Attorney, Agent, or Firm*—Sughrue Mion, PLLC

(57) ABSTRACT

A polarizer is bonded and laminated on a semi-transmitting reflective plate in which an antistatic layer of 10×10$^{10}$ ohm or less in surface resistance is formed on the back surface of a light-transmitting high-molecular substrate having laminated thereon a semi-transmitting reflective layer composed of a light-transmitting deposited metal film or metal thin film, to thereby form a semi-transmitting polarizer.

15 Claims, 3 Drawing Sheets

SEMI-TRANSMITTING REFLECTIVE PLATE, REFLECTIVE PLATE, SEMI-TRANSMITTING POLARIZER, REFLECTIVE POLARIZER AND LIQUID CRYSTAL DISPLAY USING SAME

The present application is based on Japanese Patent Applications No. 2001-294930 and 2002-131517, which are incorporated herein by reference.

BACKGROUND OF THE INVENTION

1. Field of the Invention

This invention relates to a semi-transmitting reflective plate, a reflective plate, a semi-transmitting polarizer and a reflective polarizer to be used in a liquid crystal display (hereinafter sometimes abbreviated as "LCD"), and a liquid crystal display using the same.

2. Description of the Related Art

LCDs have been used in desktop computers, electronic watches, personal computers and word processors, and a demand for them has sharply been increased in recent years. Thus, production growth of semi-transmitting reflective displays for portable phones and personal portable information terminals is remarkable.

In order to improve display performance of LCD, a semi-transmitting polarizer comprising a polarizer having laminated thereon a semi-transmitting reflective plate is provided usually on the back side of a liquid crystal cell and, as a display method, there has been employed a method in which, in the case of using the liquid crystal display under a comparatively bright atmosphere, an incident light from watching side (display side) is reflected to display an image whereas, in the case of using under a comparatively dark atmosphere, an image is displayed using a built-in light source such as a backlight provided on the back side of the semi-transmitting polarizer. That is, the semi-transmitting polarizer can save energy for a light source such as a backlight under a bright atmosphere, while using a built-in light source under a comparatively dark atmosphere, thus being useful for formation of a liquid crystal display.

However, the reflective plate has been formed by bonding and laminating on a resin substrate or by deposition or sputtering, and has been used by bonding and laminating on an optical film such as a polarizer. FIG. 2 is a schematic cross section showing an example of the constitution of a conventional semi-transmitting reflective plate or a conventional reflective plate. A semi-transmitting reflective layer or a reflective layer (conductor) 13 composed of a metal thin film is formed on a light-transmitting high-molecular substrate 11 composed of a resin (insulator) such as PET, and an adhesive layer (insulator) 14 is formed thereon to constitute a semi-transmitting plate or reflective plate 15. Therefore, the structure of sandwiching between the insulators is liable to retain static electricity, which might be the cause of a fire or electric troubles. Also, in view of the character of the product, "a protective sheet having a releasable adhesive" (hereinafter abbreviated as "SPV") is often bonded and laminated to the back surface of the substrate, and hence there has been involved the problem that mere coating of a surfactant on the substrate results in removal of the surfactant upon bonding and releasing the SPV.

SUMMARY OF THE INVENTION

Thus, in order to solve the above-described conventional problem, the invention intends to provide a semi-transmitting reflective plate, a reflective plate, a semi-transmitting polarizer and a reflective polarizer which are difficult to remove upon bonding and releasing the SPV, and a liquid crystal display using the same.

In order to solve the problems, the semi-transmitting reflective plate of the invention has an antistatic layer of $10 \times 10^{10}$ ohm or less formed on the back surface of a light-transmitting high-molecular substrate having laminated thereon a semi-transmitting reflective layer composed of a metal deposition film or a metal thin film having light-transmitting properties.

In the semi-transmitting reflective plate of the invention, the antistatic layer is preferably constituted by an electroconductive polymer.

Also, in the semi-transmitting reflective layer of the invention, the antistatic layer is preferably constituted by a resin binder to which an electroconductive filler is added.

Also, in the semi-transmitting reflective layer of the invention, the antistatic layer has a peeling strength of preferably 0.5 N/25 mm or more.

Also, in the semi-transmitting reflective layer of the invention, the antistatic layer has a light transmittance of preferably 70% or more.

Also, the semi-transmitting polarizer of the invention is characterized in that the semi-transmitting reflective plate is bonded and laminated on a polarizer.

Next, the reflective plate of the invention is characterized in that an antistatic layer having a surface resistance of $10 \times 10^{10}$ ohm or less is formed on the back surface of a light-transmitting high-molecular substrate having laminated thereon a reflective layer composed of a deposited metal film or a metal thin film.

In the reflective plate of the invention, the antistatic layer is preferably constituted by an electroconductive polymer.

Also, in the reflective layer of the invention, the antistatic layer is preferably constituted by a resin binder to which a n electroconductive filler is added.

Also, in the reflective layer of the invention, the antistatic layer has a peeling strength of preferably 0.5 N/25 mm or more.

Also, the reflective polarizer of the invention is characterized in that the reflective plate is bonded and laminated on a polarizer.

In addition, the liquid crystal display of the invention is characterized in that the semi-transmitting polarizer or the reflective polarizer is provided on at least one side of a liquid crystal cell. In this liquid crystal display, it is preferred to dispose so that the antistatic layer formed on the semi-transmitting polarizer or the reflective polarizing layer is on the back side of the display unit of the liquid crystal display.

Features and advantages of the invention will be evident from the following detailed description of the preferred embodiments described in conjunction with the attached drawings.

DETAILED DESCRIPTION OF THE PREFERRED EMBODIMENTS

Figure 1:
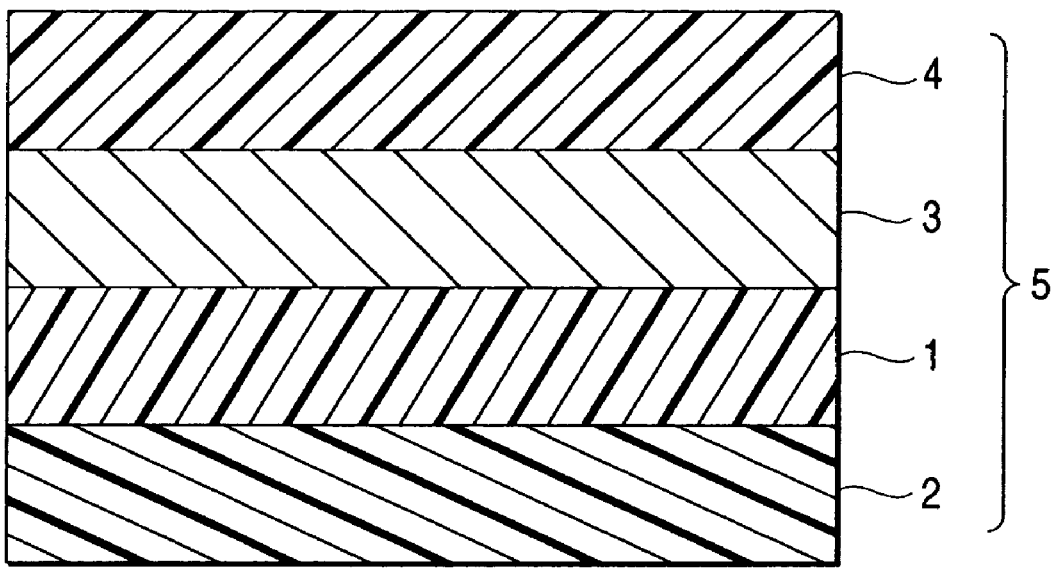
FIG. 1 is a schematic cross section showing an example of the constitution of the semi-transmitting reflective plate (reflective plate) of the invention.
Figure 2:
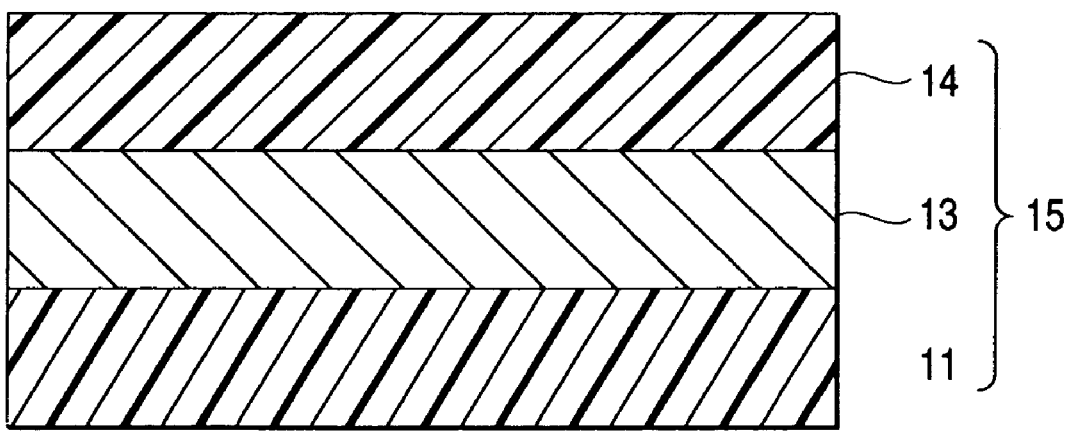
FIG. 2 is a schematic cross section showing an example of the constitution of the conventional semi-transmitting reflective plate.

In the semi-transmitting reflective plate or the reflective plate of the invention, an antistatic layer of $10 \times 10^{10}$ ohm in surface resistance is formed on the back surface of a light-transmitting high-molecular substrate having laminated thereon a semi-transmitting reflective layer composed of a light-transmitting, deposited metal film or a reflective layer composed of a deposited metal film or a metal thin film. In case where the surface resistance is more than $10 \times 10^{10}$ ohm, static electricity is liable to be accumulated in the reflective plate, which might be the cause of a fire or electric troubles, thus such surface resistance not being preferred. The surface resistance is preferably $10 \times 10^8$ ohm or less, more preferably $10 \times 10^7$ ohm or less.

As the light-transmitting high-molecular substrate, there may be used resins such as polyethylene terephthalate (PET), polycarbonate (PC), polyether sulfone (PES), polyvinyl alcohol (PVA) and triacetyl cellulose (TAC). They are not particularly limited as to thickness but, generally, the thickness is 6 to 100 $\mu$m.

The semi-transmitting reflective layer or the reflective layer is formed of, for example, a deposited metal film or a metal thin film. Examples of the metals to be used for the deposited metal film or the metal thin film include aluminum, silver, silver-palladium alloy and chromium.

Also, as the antistatic layer, any one that has the aforesaid properties may be used with no particular limitation but, in order to prevent delamination of the layer upon bonding or releasing SPV, it is preferred to form an electroconductive layer comprising an electroconductive polymer or a resin binder to which an electroconductive filler is added. In the semi-transmitting reflective plate, the antistatic layer has a light transmittance of 70% or more, more preferably 80% or more. The thickness of the antistatic layer is not particularly limited, but is generally 0.1 to 50 $\mu$m.

The electroconductive polymer is not particularly limited, and there may be used all of conventionally known electroconductive polymers such as polyaniline, polyacetyrene, and various doped materials obtained by subjecting these polymers to an ion-doping procedure. Examples of the electroconductive filler include indium oxide, tinoxide, zinc oxide, and ATO (antimony tin oxide).

Method for forming the antistatic layer is not particularly limited, and there may be employed a method of coating a conductive paint containing the electroconductive polymer or the electroconductive filler to a light-transmitting high-molecular substrate and drying the coat to form the antistatic layer. Additionally, it is also possible to use a commercially available electroconductive paint.

Also, in preparing for the case of directly bonding an EL backlight, a diffuser or a prism sheet onto the back surface of the antistatic layer, the antistatic layer has an adhesion force to the light-transmitting high-molecular substrate of preferably 0.5 N/25 mm or more, more preferably 2 N/25 mm or more, still more preferably 5 N/25 mm or more in terms of peeling strength.

FIG. 1 shows an example of the constitution of the semi-transmitting reflective plate (or reflective plate) of the invention. A semi-transmitting reflective layer (or reflective layer) 3 is formed on a light-transmitting high-molecular substrate 1, an adhesive layer 4 is formed thereon and, on the opposite side of the light-transmitting high-polymer substrate, there is formed an antistatic layer 2 to constitute a semi-transmitting reflective plate (or reflective plate) 5. In mounting this in a display, it is disposed so that the antistatic layer of the semi-transmitting reflective plate (or reflective plate) 5 is on the back side of the display unit, whereby generated electric charge can smoothly migrate to a part leading to the ground, thus the generated static electricity being easily removed.

Also, the semi-transmitting polarizer of the invention is constituted by bonding and laminating the semi-transmitting reflective plate and a polarizer, and the reflective polarizer is constituted by bonding and laminating the reflective plate and a polarizer. Additionally, in conducting bonding and lamination, a proper bonding means such as an adhesive may be employed.

The polarizer to be used in the invention is not particularly limited, but its fundamental constitution comprises a polarizing element composed of a polyvinyl alcohol series polarizing film containing a dichroic substance having on the one side or both sides thereof a transparent protective film as a protective layer, with a proper adhesive layer such as an adhesive layer composed of a vinyl alcohol series polymer intervening therebetween.

As the polarizing element (polarizing film), a proper one may be used which is obtained by subjecting a film composed of, for example, avinyl alcohol series polymer such as polyvinyl alcohol or partially formal-converted polyvinyl alcohol to a proper treatment such as a dyeing treatment using a dichroic substance comprising iodine or a dichroic dye, a stretching treatment or a cross-linking treatment in a proper order or manner, and which transmits a linear polarized light when a natural light is incident upon it. In particular, those which are excellent in light transmittance or polarizing degree are preferred.

As a material for the protective film which is used to form the transparent protective layer on the one side or both sides of the polarizing element (polarizing film), a proper transparent film may be used. Examples of the polymer to be used include acetate series resins such as triacetyl cellulose are generally used which, however, are not limitative at all.

The semi-transmitting polarizer can constitute a liquid crystal display of the type wherein the semi-transmitting polarizer is commonly provided on the back side of a liquid crystal cell and, in the case of using the liquid crystal display under a comparatively bright atmosphere, an incident light from the viewing side (display side) is reflected to display an image and, in the case of using the liquid crystal display under a comparatively dark atmosphere, an image is displayed using a built-in light source such as a backlight provided on the back side of the semi-transmitting polarizer. That is, the semi-transmitting polarizer is useful for constituting a liquid crystal display of the type in which, under a bright atmosphere, the semi-transmitting polarizer can save energy for the light source such as backlight and, even under a comparatively dark atmosphere, a built-in light source permits to view an image.

The reflective polarizer can constitute a liquid crystal display of the type wherein the reflective polarizer is commonly provided on the backside of a liquid crystal cell, and an incident light from the viewing side (display side) is reflected to display an image. That is, the reflective polarizer can eliminate integration of a light source such as a backlight, and is advantageous in reducing the thickness of the liquid crystal display.

In the semi-transmitting reflective plate, the reflective plate, the transmitting polarizer or the reflective polarizer of the invention may be provided an adhesive layer for bonding them to a member such as liquid crystal cell. Adhesives to be used for forming the adhesive layer are not particularly limited, and there may be used proper ones such as acryl series ones, silicone series ones, polyester series ones, polyurethane series ones, polyether series ones and rubber series ones. It suffices to provide the adhesive layer on a necessary side as needed. The thickness of the adhesive layer is not particularly limited, either, and is generally 10 to 30 $\mu$m.

Additionally, in the case where the provided adhesive layer is laid bare at the surface, it is preferred to cover the adhesive layer by a separator (releasable film) for preventing it from being stained before use. The separator may be formed by, for example, coating a release agent such as a silicone series release agent, a long-chained alkyl series release agent, a fluorine-containing releasing agent or molybdenum sulfide as needed on a proper thin member.

Also, the liquid crystal display of the invention is a device wherein the semi-transmitting polarizer or the reflective polarizer is disposed on at least one side of a liquid crystal cell.

This liquid crystal display may be constituted as having a proper constitution in accordance with a conventional one wherein the polarizer is disposed on the one side or both sides of a liquid crystal cell. Thus, the liquid crystal display-constituting liquid crystal cell is not limited and, for example, there may be employed proper type liquid crystal cells such as active matrix-driving type liquid crystal cells represented by thin film transistor type liquid crystal cells; and simple matrix-driving type liquid crystal cells represented by twist nematic type liquid crystal cells and super-twist nematic type liquid crystal cells.

In constituting the liquid crystal display, proper parts such as a prism array sheet, a lens array sheet, a light-diffusing plate and a backlight may be disposed at an appropriate position or positions each as a single layer or two or more layers.

The invention is described more specifically by reference to Examples and Comparative Examples which, however, are not to be construed as limiting the invention.

EXAMPLE 1

Figure 3:
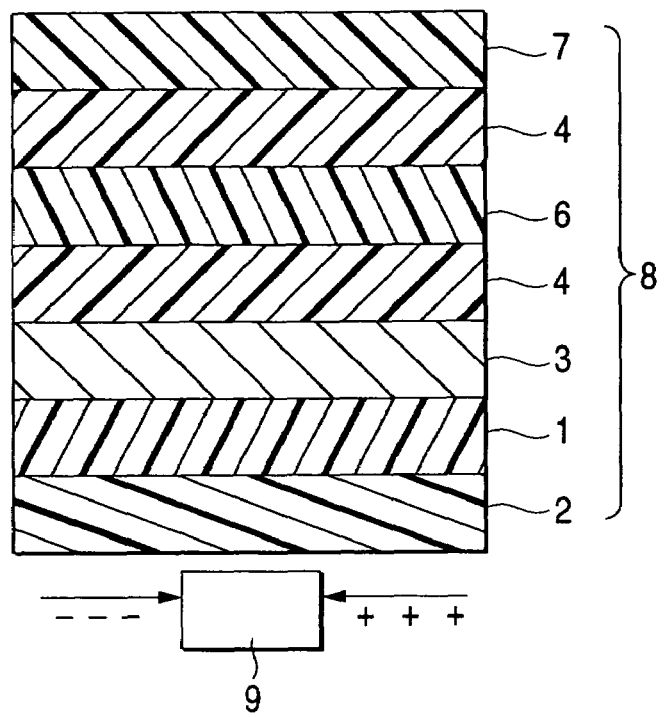
FIG. 3 is a schematic cross section showing an example of the constitution of the reflective polarizer (semi-transmitting polarizer) of the invention.

An electroconductive polymer type antistatic agent (conductive paint "Detron"; made by Bayer) was coated on a reflective plate (trade name: Alpet 50; made by Toyo Aluminum; thickness of the aluminum foil: 15 $\mu$m; thickness of PET substrate: 50 $\mu$m) to form a 0.2-$\mu$m thick antistatic layer. This antistatic layer had a surface resistance of $6\times10^5$ ohm. A polarizer (trade name: F1205; made by Nitto Denko Corporation) was bonded and laminated thereon via an adhesive layer of 25 $\mu$m in thickness to obtain a reflective polarizer. The adhesive layer provided on the polarizer was covered with a releasable film before practical use. FIG. 3 is a schematic view showing the cross sectional constitution of this reflective polarizer, wherein the aluminum foil 3 is in an insulated state sandwiched between the adhesive layer 4 and the PET substrate 1. The reference numeral 6 shows the polarizer and the reference numeral 7 shows the releasable film.

With the reflective polarizer, adhesion force (peeling strength) of the antistatic layer to the PET substrate was measured to be 2.4 N/25 mm according to 180-degree peeling test at a peeling rate of 0.3 m/min using a utility tensile tester, Tensilon.

Then, when a roll of the product of this Example was unwound via a metal roll, the charge amount did not exceed 500 V.

EXAMPLE 2

An electroconductive paint containing dispersed therein a conductive filler ($SnO_2$) (trade name: P3001; made by Shokubai Kasei K.K.) was coated on a silver-deposited semi-transmitting reflective plate (transmittance: 10%; reflectance: 70%; thickness of PET substrate: 50 $\mu$m) to form a 1-$\mu$m thick antistatic layer of 80% in light transmittance. This antistatic layer had a surface resistance of $10\times10^6$ ohm. A polarizer (trade name: F1205; made by Nitto Denko Corporation) was bonded and laminated thereon via an adhesive layer of 25 $\mu$m in thickness to obtain a semi-transmitting polarizer. Additionally, in this constitution, the silver-deposited film is in an insulated state sandwiched between the adhesive layer and the PET substrate.

Adhesion force (peeling strength) of the antistatic layer to the PET substrate was measured to be 2 N/25 mm according to 180-degree peeling test at a peeling rate of 0.3 m/min in the same manner as in Example 1.

Then, when a roll of the product of this Example was unwound via a metal roll, the charge amount did not exceed 500 V.

Also, when a protective sheet having provided thereon a releasable adhesive (SPV-PPF100T; made by Nitto Denko Corporation) was bonded and laminated onto the semi-transmitting polarizer, followed by subjecting the laminate to an autoclave treatment (50° C., $5\times10^5$ Pa, 20 minutes) and peeling treatment, the antistatic layer was not removed.

EXAMPLE 3

An electroconductive paint containing dispersed therein a conductive filler (trade name: Shintron D600; made by Shinto Toryo K.K.) was coated on a silver-deposited semi-transmitting reflective plate (transmittance: 10%; reflectance: 70%; thickness of PET substrate: 50 $\mu$m) to form a 20-$\mu$m thick antistatic layer of 70% in light transmittance. This antistatic layer had a surface resistance of $10\times10^{10}$ ohm. A polarizer (trade name: F1205; made by Nitto Denko Corporation) was bonded and laminated thereon via an adhesive layer of 25 $\mu$m in thickness to obtain a semi-transmitting polarizer. Additionally, in this constitution, the silver-deposited film is in an insulated state sandwiched between the adhesive layer and the PET substrate.

Adhesion force (peeling strength) of the antistatic layer to the PET substrate was measured to be 2 N/25 mm or more according to 180-degree peeling test at a peeling rate of 0.3 m/min in the same manner as in Example 1.

Then, when a roll of the product of this Example was unwound via a metal roll, the charge amount did not exceed 500 V.

When a protective sheet having provided thereon a releasable adhesive (SPV-PPF100T; made by Nitto Denko Corporation) was bonded and laminated onto the semi-transmitting polarizer, followed by subjecting the laminate to an autoclave treatment (50° C., $5\times10^5$ Pa, 20 minutes) and peeling treatment, the antistatic layer was not removed.

EXAMPLE 4

A silver-deposited semi-transmitting reflective plate (transmittance: 10%; reflectance: 70%; thickness of PET substrate: 50 μm) was subjected to saponification to impart easily adhesive properties. Polyaniline (electroconductive binder; containing 10% by weight of a binder resin) was coated thereon to form a 0.1-μm thick antistatic layer of 80% in light transmittance. This antistatic layer had a surface resistance of $10 \times 10^{10}$ ohm. A polarizer (trade name: F1205; made by Nitto Denko Corporation) was bonded and laminated thereon via an adhesive layer of 25 μm in thickness to obtain a semi-transmitting polarizer. Additionally, in this constitution, the silver-deposited film is in an insulated state sandwiched between the adhesive layer and the PET substrate.

Adhesion force (peeling strength) of the antistatic layer to the PET substrate was measured to be 2 N/25 mm or more according to 180-degree peeling test in the same manner as in Example 1.

Then, when a roll of the product of this Example was unwound via a metal roll, the charge amount did not exceed 500 V.

When a protective sheet having provided thereon a releasable adhesive (SPV-PPF100T; made by Nitto Denko Corporation) was bonded and laminated onto the semi-transmitting polarizer obtained above, followed by subjecting the laminate to an autoclave treatment (50° C., $5 \times 10^5$ Pa, 20 minutes) and peeling treatment, the antistatic layer was not removed.

It is seen that, in the products of the invention shown in Examples 1 to 4 generated only a small amount of charge in spite of the aluminum foil or the silver-deposited film 3 being in an insulated state sandwiched between the adhesive layer 4 and the PET substrate 1. This may be attributed to that, even when the substrate is charged, the charge migrates to the grounded portion of the surface, thus static electricity being removed. In addition, the charge runs away so gradually that a spark is difficult to occur.

Comparative Example 1

Figure 4:
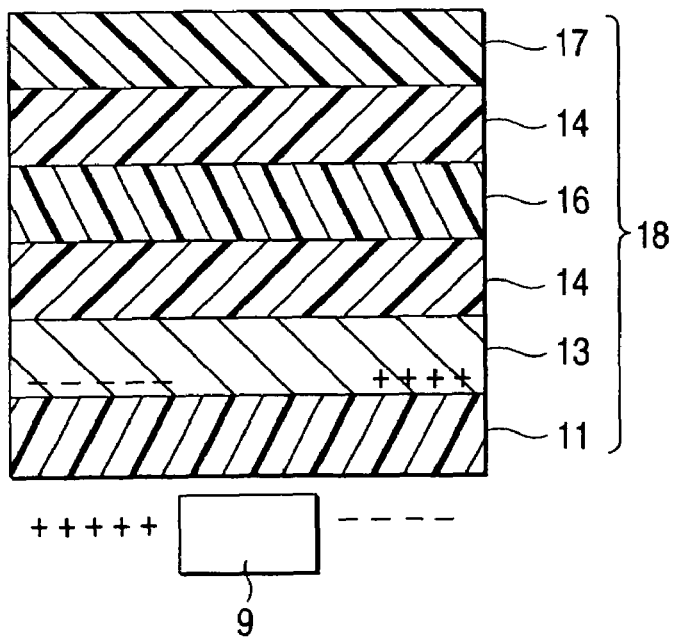
FIG. 4 is a schematic cross section showing an example of the constitution of the conventional reflective polarizer.

A polarizer (trade name: F1205; made by Nitto Denko Corporation) was bonded and laminated on a reflective plate (trade name: Alpet; made by Toyo Aluminum K.K.; thickness of aluminum foil: 15 μm; thickness of PET substrate: 50 μm) via an adhesive layer of 25 μm in thickness to obtain a reflective polarizer. The adhesive layer provided on the polarizer was covered with a releasable film before practical use. FIG. 4 is a schematic view showing the cross sectional constitution of this reflective polarizer, wherein the aluminum foil 13 is in an insulated state sandwiched between the adhesive layer 14 and the PET substrate 11. The reference numeral 16 shows the polarizer and the reference numeral 17 shows the releasable film.

Then, when a roll of the product of this Example was unwound via a metal roll, the charge amount exceed 1000 V.

A polarizer (trade name: F1205; made by Nitto Denko Corporation) was bonded and laminated on a reflective plate (trade name: Alpet; made by Toyo Aluminum K.K.; thickness of aluminum foil: 15 μm; thickness of PET substrate: 50 μm) via an adhesive layer of 25 μm in thickness. A surfactant series antistatic agent (SB-8; made by Sumitomo Kaga ku K. K.) was sprayed onto the back surface of the PET substrate. The electric resistance of the thus-treated surface was about $10 \times 10^{10}$ ohm, thus the surface having an enough antistatic effect. However, when a protective sheet having thereon a releasable adhesive (SPV-PPF100T; made by Nitto Denko Corporation) was bonded and laminated on the antistatic layer for the purpose of preventing the back surface from being flawn, and peeled, the antistatic layer was removed with the SPV adhesive, thus antistatic effect being lost.

In the reflective polarizers shown in Comparative Examples 1 to 2, the aluminum foil 13 is in an insulated state sandwiched between the adhesive 14 and the PET substrate 1 as shown in FIG. 4, and when the substrate was charged, it functions as a condenser between the PET film and the aluminum foil, and hence the charge is supposedly difficult to migrate and run away along the surface of the substrate. Also, in the case of grounding, the electrostatic charge is removed only at the grounded portion, with charge in other portions remaining. Further, although grounding the aluminum foil serves to remove static electricity, migration of charge is so fast that a large electric current flows to cause a phenomenon of spark.

Figure 5:
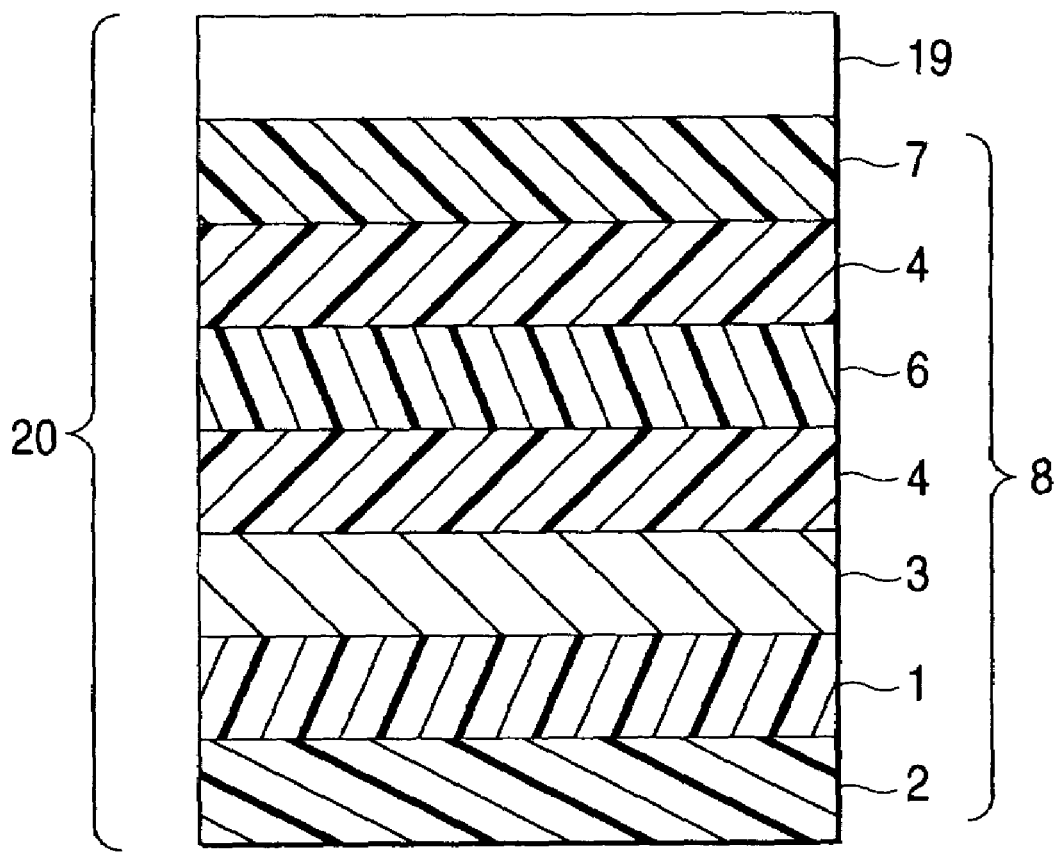
FIG. 5 is a schematic cross section showing an example of the constitution of the liquid crystal display of the invention.

Further, a liquid crystal display 20 of the invention is manufactured as shown in FIG. 5, wherein the semi-transmitting polarizer (reflective polarizer) 8 of the invention is provided on at least one side of a liquid crystal cell 19. The semi-transmitting polarizer (reflective polarizer) 8 is provided so that the antistatic layer 2 formed in the semi-transmitting polarizer or the reflective polarizer is on the back side of the liquid crystal display 20. The upper side of the display 20 in FIG. 5 is the visual side.

As has been described here in before, the invention provides a semi-transmitting polarizer or the reflective polarizer which does not accumulate electrostatic charge due to formation of an antistatic layer on the back surface of a light-transmitting high-molecular substrate having laminated thereon a semi-transmitting reflective layer or a reflective layer and which, therefore, does not cause a fire or electric troubles by the charged static electricity. In addition, even when SPV is bonded and laminated thereon and peeled off, the antistatic layer is not removed, which is effective in the case of mounting it on a liquid crystal display.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A semi-transmitting reflective plate comprising:
   a light-transmitting high-molecular substrate;
   a semi-transmitting reflective layer laminated on a first side of said substrate and being made of one of a light-transmitting metal deposition film and a metal thin film; and
   an antistatic layer laminated on a second side of said substrate and having $10 \times 10^{10}$ ohm or less in surface resistance.

2. A semi-transmitting reflective plate according to claim 1, wherein the antistatic layer comprises an electroconductive polymer.

3. A semi-transmitting reflective plate according to claim 1, wherein the antistatic layer is constituted by a resin binder to which an electroconductive filler is added.

4. A semi-transmitting reflective plate according to claim 1, wherein the antistatic layer has a peeling strength of 0.5 N/25 mm or more.

5. A semi-transmitting reflective plate according to claim 1, wherein the antistatic layer has a light transmittance of 70% or more.

6. A semi-transmitting polarizer, which comprises the semi-transmitting reflective plate according to claim 1 having bonded and laminated thereon a polarizer.

7. A liquid crystal display, in which the semi-transmitting polarizer according to claim 6 is provided on at least one side of a liquid crystal cell.

8. A liquid crystal display according to claim 7, wherein the semi-transmitting polarizer is provided so that the antistatic layer formed in the semi-transmitting polarizer or the reflective polarizer is on the back side of the display unit of the liquid crystal display.

9. A reflective plate comprising:
a light-transmitting high-molecular substrate;
a reflective layer laminated on a first side of said substrate and being made of one of a metal deposition film and a metal thin film; and
an antistatic layer laminated on a second side of said substrate and having $10 \times 10^{10}$ ohm or less in surface resistance.

10. A reflective plate according to claim 9, wherein the antistatic layer comprises an electroconductive polymer.

11. A reflective plate according to claim 9, wherein the antistatic layer is constituted by a resin binder to which an electroconductive filler is added.

12. A reflective plate according to claim 9, wherein the antistatic layer has a peeling strength of 0.5 N/25 mm or more.

13. A reflective polarizer, which comprises the reflective plate according to claim 9 having bonded and laminated thereon a polarizer.

14. A liquid crystal display, in which the reflective polarizer according to claim 13 is provided on at least one side of a liquid crystal cell.

15. A liquid crystal display according to claim 14, wherein the reflective polarizer is provided so that the antistatic layer formed in the semi-transmitting polarizer or the reflective polarizer is on the back side of the display unit of the liquid crystal display.

* * * * *